United States Patent
Henzler et al.

(10) Patent No.: US 6,948,414 B2
(45) Date of Patent: Sep. 27, 2005

(54) CUTTING SUBASSEMBLY

(75) Inventors: Roland Henzler, Nuertingen-Raidwangen (DE); Werner Binder, Stuttgart (DE)

(73) Assignee: Reich Spezialmaschinen GmbH, Nuertingen (DE)

( * ) Notice: Subject to any disclaimer, the term of this patent is extended or adjusted under 35 U.S.C. 154(b) by 0 days.

(21) Appl. No.: 10/290,071

(22) Filed: Nov. 6, 2002

(65) Prior Publication Data

US 2003/0116005 A1 Jun. 26, 2003

Related U.S. Application Data

(63) Continuation of application No. PCT/EP02/01607, filed on Feb. 15, 2002.

(30) Foreign Application Priority Data

Mar. 15, 2001 (DE) .......................................... 101 12 440

(51) Int. Cl.[7] .......................... B23D 19/00; B23D 33/02; B26D 1/14; B26D 1/18
(52) U.S. Cl. .......................... 83/473; 83/477.1; 83/485; 83/486; 83/486.1; 83/487; 83/488; 83/581
(58) Field of Search ................................ 83/473, 477.1, 83/485–489, 581, 471.3

(56) References Cited

U.S. PATENT DOCUMENTS

| | | | | |
|---|---|---|---|---|
| 3,557,652 A | * | 1/1971 | Krall et al. ..................... 83/488 |
| 4,750,254 A | * | 6/1988 | Kalmbach ..................... 83/421 |
| 4,763,703 A | * | 8/1988 | Fromm ........................ 83/473 |
| 5,357,834 A | * | 10/1994 | Ito et al. ......................... 83/581 |
| D404,405 S | * | 1/1999 | Hammett et al. ........... D15/133 |
| 6,591,725 B1 | * | 7/2003 | Martin ......................... 83/473 |
| 6,681,493 B2 | * | 1/2004 | Mori et al. .................... 30/376 |
| 6,732,620 B1 | * | 5/2004 | Brodmann et al. ........... 83/489 |

FOREIGN PATENT DOCUMENTS

| | | | |
|---|---|---|---|
| DE | 2553042 | * | 6/1977 |
| DE | 25 53 042 | | 6/1977 |
| DE | 32 24 467 | | 1/1984 |
| DE | 3224467 A1 | * | 1/1984 |
| DE | 88 07 514 | | 8/1988 |
| DE | 37 17 207 | | 12/1988 |
| DE | 3717207 A1 | * | 12/1988 |
| EP | 0 538 513 | | 4/1993 |
| EP | 0538513 A1 | * | 4/1993 |

* cited by examiner

*Primary Examiner*—Allan N. Shoap
*Assistant Examiner*—Jason Prone
(74) *Attorney, Agent, or Firm*—Lipsitz & McAllister, LLC

(57) ABSTRACT

The invention relates to a cutting subassembly for cutting off front and/or rear edge overhangs of panel-like workpieces. The cutting subassembly includes a saw unit which comprises a motor-driven saw blade which is mounted for displacement between a position above, and a position beneath, the workpiece. A contact element is associated with the saw blade and has at least one contact surface which may be engaged against the front or rear transverse side of the workpiece. The cutting plane of the saw blade may be oriented in alignment with the contact surface. The saw blade may be mounted such that it can be pivoted between a first operating position, in which it is oriented in alignment with the contact surface, and a second operating position, in which it is oriented obliquely in relation to the contact surface.

12 Claims, 5 Drawing Sheets

CUTTING SUBASSEMBLY

The present disclosure relates to the subject matter disclosed in International patent application No. PCT/EP02/01607 of Feb. 15, 2002, which is incorporated herein by reference in its entirety and for all purposes.

BACKGROUND OF THE INVENTION

The invention relates to a cutting subassembly for machines. A panel-like workpiece is moved continuously in a rectilinear manner in order for edge-material overhangs projecting beyond the front and/or rear transverse sides of the workpiece, which are oriented substantially transversely to the movement direction of the workpiece, to be cut off by a cutting subassembly. The cutting subassembly is provided on the longitudinal sides of the workpiece, the longitudinal sides running parallel to the movement direction. The cutting subassembly has a saw unit which comprises a motor-driven saw blade and which is mounted such that it can be displaced between a position above the workpiece and a position beneath the workpiece. The cutting subassembly also has a contact element which is associated with the saw blade and at least one contact surface. With such a cutting subassembly it is possible for the contact surface to be engaged against the front or rear transverse side of the workpiece and for the cutting plane of the saw blade to be oriented in alignment with the contact surface.

Such cutting subassemblies are known from EP 0 538 513 B1. They are used, in particular, in the case of edge-banding machines for gluing edge material onto a longitudinal side of the workpiece. Following the gluing operation, the glue-on edge has an edge overhang which can be cut off by means of the cutting subassembly.

For the cutting-off operation, use is made of a saw unit with a saw blade which is usually driven by means of an electric motor. The saw unit can be displaced between a position above, and a position beneath, the workpiece, in order to cut off an edge overhang by the saw blade during the movement.

The contact element is used in order to orient the saw blade level with the front and/or rear transverse side of the workpiece, it being possible for the cutting plane of the saw blade to be oriented in alignment with the contact surface of the contact element.

If the cutting plane is oriented in alignment with the contact surface, then the edge overhang is cut off by a saw cut oriented perpendicularly to the movement direction of the workpiece. Such an orientation is usually selected when edge material is glued onto the longitudinal sides of the workpiece, but not onto the transverse sides of the workpiece. In many cases, however, edge material has already been provided on the transverse sides in a preceding operating step. If the longitudinal side of the workpiece is then also to be covered by edge material, it is necessary to ensure, for the operation of cutting off edge overhangs, that the saw blade does not damage the edge material which has already been glued onto the transverse side. For this purpose, the saw blade is oriented obliquely in relation to the contact surface, with the result that the saw blade assumes an angle of less than 90° in relation to the edge material glued onto the longitudinal side of the workpiece. Therefore, during the operation of cutting off an edge overhang in a flush manner, the edge material glued onto the transverse side is not damaged. Orienting the saw blade obliquely in relation to the contact surface, in the case of known cutting subassemblies, necessitates high-outlay conversion, which can only be carried out by skilled personnel. This conversion is associated with a considerable outlay in terms of time and costs.

DE 37 17 207 A1 discloses a cutting subassembly in which the saw blade, for cutting off the front and the rear edge overhangs, can be pivoted between two predetermined fixed positions, each position oriented obliquely in relation to the corresponding contact surface. The saw blade is mounted on a saw unit which is retained in a pivotable manner in guide slots. The guide slots define fixed oblique positions which the saw unit inevitably assumes when cutting off an edge overhang. Changing the oblique position is not envisaged, nor is orientation of the saw blade in alignment with the contact surface.

It is an object of the present invention to develop a cutting subassembly of the type mentioned in the introduction such that the orientation of the saw blade relative to the contact surface is simplified and can be changed in a straightforward manner.

SUMMARY OF THE INVENTION

This object is achieved according to the invention, in the case of a cutting subassembly of the generic type, by the saw blade being mounted such that it can be pivoted between a first operating position, in which it is oriented in alignment with the contact surface, and a second operating position, in which it is oriented obliquely in relation to the contact surface. The cutting subassembly may comprise adjustable stops for orienting the saw blade in its first, aligned operating position and in Its second, obliquely oriented operating position. Such a configuration of the cutting subassembly makes it possible to use a single saw blade to execute both saw cuts oriented perpendicularly to the movement direction of the workpiece and saw cuts oriented obliquely in relation to the movement direction, without a high-outlay conversion of the cutting subassembly being necessary for this purpose. Rather, with the present invention, the pivotable mounting of the saw blade makes it possible to change the orientation of the saw blade in relation to the contact surface of the contact element in an easy-to-handle manner. Provision may be made for varying the orientation of the saw blade continuously in relation to the contact surface over a predetermined angle range. The stops make it possible for the saw blade to be reliably oriented In a straightforward manner in design terms. For this purpose, pins may be provided, for example, on the pivoting arm. The pins may be engaged against the stops in order to allow the saw blade to be oriented reliably in the respective operating position. The stops are of adjustable configuration, which makes it possible, depending on the respective edge material which is to have its overhang cut off, to provide different orientations for the saw blade in its second operating position. In particular, provision may be made for the angle which the saw blade is to assume in relation to the contact surface in its second operating position to be selected in dependence on the thickness of the edge material.

It is advantageous if the saw blade, in the second operating position, can be positioned at an angle of up to approximately 15° in relation to the contact surface.

It is particularly advantageous if the contact element comprises a first contact surface for butting against the front transverse side of the workpiece, as seen in the movement direction, and a second contact surface for butting against the rear transverse side of the workpiece, as seen in the movement direction. The saw blade may be oriented both in alignment with the respective contact surfaces and obliquely in relation to the respective contact surfaces. This makes it possible to use a single cutting subassembly to cut off both a front and a rear edge overhang and to execute a saw cut perpendicularly to the movement direction of the workpiece or a saw cut obliquely in relation to the movement direction of the workpiece.

The contact element and the saw blade are preferably mounted such that they can be displaced in relation to one another in respect of the movement direction of the workpiece. The saw blade can then be pivoted, in relation to the front and the rear contact surfaces, in each case between a first, aligned operating position and a second, obliquely oriented operating position. On the one hand, this makes it possible for the saw blade and contact element to be displaced relative to one another such that the saw blade can assume an aligned arrangement in relation to the two contact surfaces. On the other hand, the saw blade can be adjusted continuously by means of a pivoting movement between its first operating position and its second operating position.

In the case of a particularly user-friendly embodiment of the cutting subassembly according to the invention, it is provided that the saw blade can be pivoted by means of a piston/cylinder subassembly. The piston/cylinder subassembly may be actuated pneumatically or hydraulically.

It is particularly advantageous if the saw blade can be both pivoted and displaced by means of the piston/cylinder subassembly. This allows a configuration of straightforward design which does not require any separate drive subassemblies for pivoting and for displacing the saw blade relative to the contact element. Rather, a single piston/cylinder subassembly can be used both to pivot and to displace the saw blade.

In order to displace the saw unit relative to the contact element, a guide element may be provided which can be displaced parallel to the movement direction of the workpiece. The saw unit may be mounted on the guide element such that it can be pivoted about a vertical oriented pivot axis. The guide element may be retained on profile rails, for example in the form of a dovetail guide. It is also possible, however, to use a round guide.

It is advantageous if the guide element comprises a horizontally displaceable carriage, on which the saw unit may be mounted in a pivotable manner. The horizontal carriage can be mounted such that it can be displaced on guide rails oriented parallel to the movement direction of the workpiece, and can accommodate the saw unit, which is mounted in a pivotable manner on the horizontal carriage.

The saw unit is preferably mounted on the guide element by means of a pivoting arm mounted in a pivotable manner on the guide element.

It is particularly advantageous if the pivoting arm can be pivoted by means of a piston/cylinder subassembly. It has proven advantageous for the piston/cylinder subassembly to be articulated on the pivoting arm, so that it is possible to dispense with additional transmission means for transmitting the movement of the piston/cylinder subassembly to the pivoting arm.

If the intention is merely to execute saw cuts perpendicularly to the movement direction of the workpiece, it has proven advantageous if the saw unit can be fixed in a releasable manner on the guide element with the saw blade oriented in a first operating position. Provision may be made, for example, for the pivoting arm to be fixed in a releasable manner on the guide element in the first operating position of the saw blade, so that, in the fixed state, it is not possible for any pivoting movement to take place, but the pivoting arm can be displaced along the guide arrangement by means of the piston/cylinder subassembly.

In the case of a particularly preferred embodiment of the cutting subassembly according to the invention, it is provided that the stops, for orienting the saw blade, can be adjusted in the movement direction of the workpiece. Possible stops used may be stop bolts which can be adjusted, for example, in the movement direction of the workpiece.

In order to ensure that the saw blades can be oriented in dependence on the position of the stops, it has proven advantageous if the stops are associated with at last one spring element in order to decelerate a displacement movement of the saw unit as the latter approaches a stop. The spring element can subject the saw unit, as it approaches the stop, to such a spring force that the displacement movement of the saw unit parallel to the movement direction of the workpiece is decelerated, while a pivoting movement of the saw unit can take place without obstruction. If the saw unit moves away from an associated stop, then the displacement movement of the saw unit is accelerated by means of the spring element, so that the saw unit moves away from the stop initially parallel to the movement direction and, at a distance from the respective stop, to execute a pivoting movement in addition to the displacement movement.

The spring element may be configured, for example, as a spring bolt which can be engaged against the horizontal carriage. It has proven particularly advantageous if in each case two stops are associated with a common spring bolt which, as the saw unit approaches the two stops, subjects the saw unit to a spring force.

DETAILED DESCRIPTION OF THE INVENTION

Figure 1:
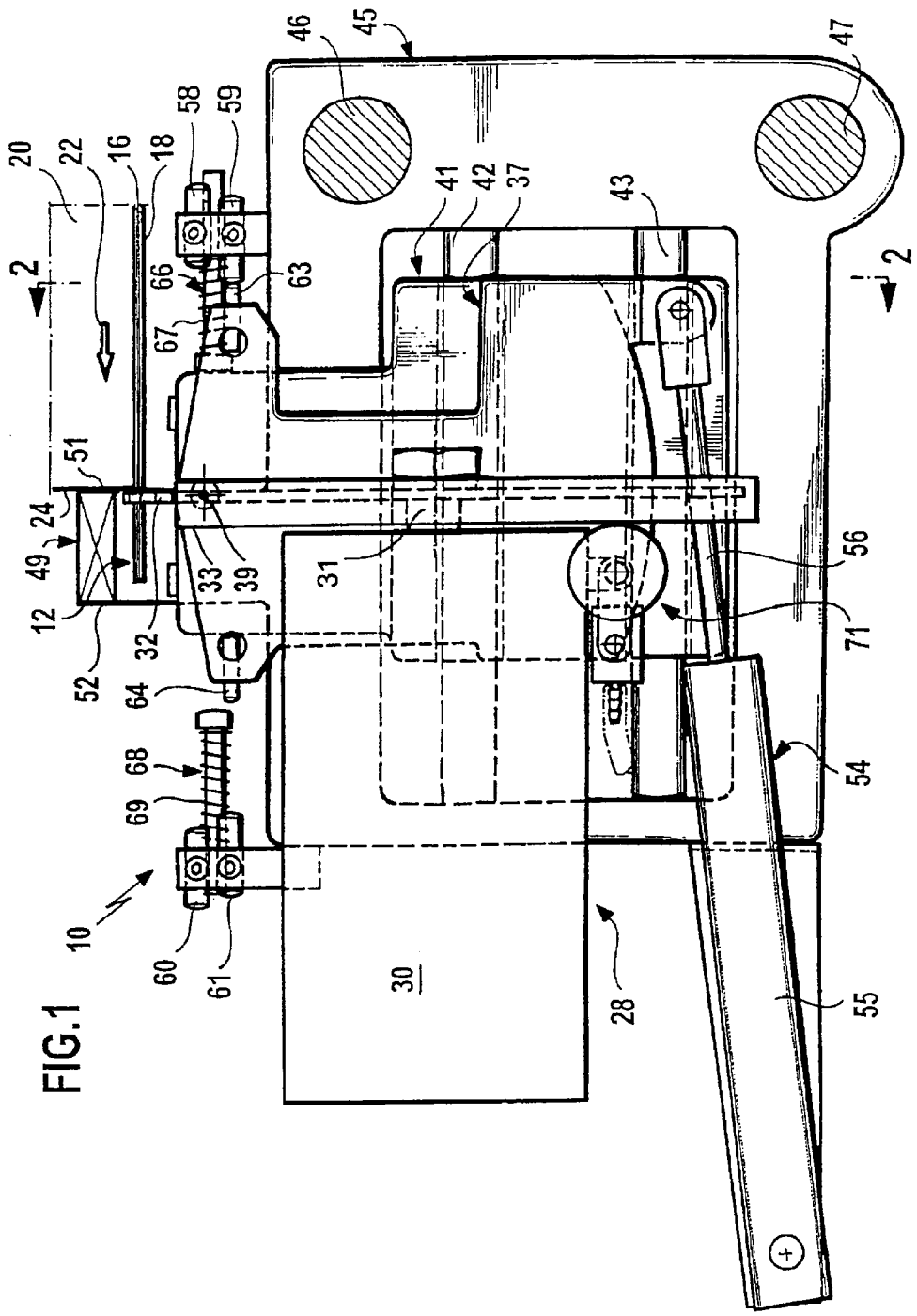
FIG. 1 shows a plan view of a cutting subassembly during the operation of cutting off a front edge overhang with the saw blade oriented parallel to a front contact surface.

The drawings illustrate, schematically, a cutting subassembly which is designated overall by the reference sign 10 and is intended for cutting off a front edge overhang 12 and a rear edge overhang 14 of a glue-on edge 16 which has been glued onto a longitudinal side 18 of a workpiece 20. The cutting subassembly 10 forms one of a number of stations of a machine for machining panel-like workpieces which are moved continuously in a rectilinear manner along a workpiece-passage plane. In this case, in a glue-on station disposed upstream of the cutting subassembly 10, the glue-on edge 16 is glued onto the longitudinal side 18 of the workpiece 20. The glued-on edge 16 projects forward beyond the front transverse side 24 and rearward beyond the rear transverse side 26 of the workpiece 20, as seen in the movement direction 22 of the workpiece 20, and forms the front and rear edge overhangs 12 and 14, respectively, in these regions.

In order to cut off the front and rear edge overhangs 12, 14, the cutting subassembly 10 comprises a single saw unit 28 with an electric motor 30 and a saw blade 32. The saw blade 32 is mounted in a rotationally fixed manner on the motor shaft 31, is enclosed by a protective cover 33 and projects beyond the protective cover 33 merely in the circumferential region which is directed toward the workpiece 20.

The saw unit 28 is secured in a rotationally fixed manner, by means of fastening screws 35, on a pivoting arm 37. The pivoting arm 37 is mounted on a horizontal carriage 41 such that it can be pivoted about a vertically oriented pivot axis 39. The horizontal carriage 41, in turn, is mounted in a displaceable manner on two guide rods 42, 43 which are oriented parallel to the movement direction 22 of the workpiece 20. The guide rods 42, 43 are secured on a vertical carriage 45, which is mounted in a displaceable manner on vertically oriented guide rods 46 and 47.

By means of the vertical carriage 45, the saw unit 28 can be displaced vertically along the guide rods 46, 47 between a position above the workpiece 20 and a position beneath the moving workpiece 20. The edge overhangs 12 and 14 may therefore be cut off by means of the vertical movement of the saw blade 32 during the displacement of the saw unit 28 from the position above the workpiece to the position below the workpiece. A contact element 49 in the form of an extension arm is retained in a rigid manner on the vertical carriage 45 by means of screws (not illustrated in the drawing). The contact element 49 has a first contact surface 51, which is associated with the front transverse side 24, and a second contact surface 52, which is associated with the rear transverse side 26. The first contact surface 51 can be engaged against the front transverse side 24 in order for the front edge overhang 12 to be cut off. Correspondingly, the second contact surface 52 can be engaged against the transverse side 26 in order for the rear edge overhang 14 to be cut off.

With the aid of the horizontal carriage 41, the saw unit 28 can be displaced parallel to the movement direction 22 such that the saw blade 32, for cutting off the edge overhangs 12 and 14, may be oriented in alignment with the contact surfaces 51 and 52 in each case.

Figure 3:
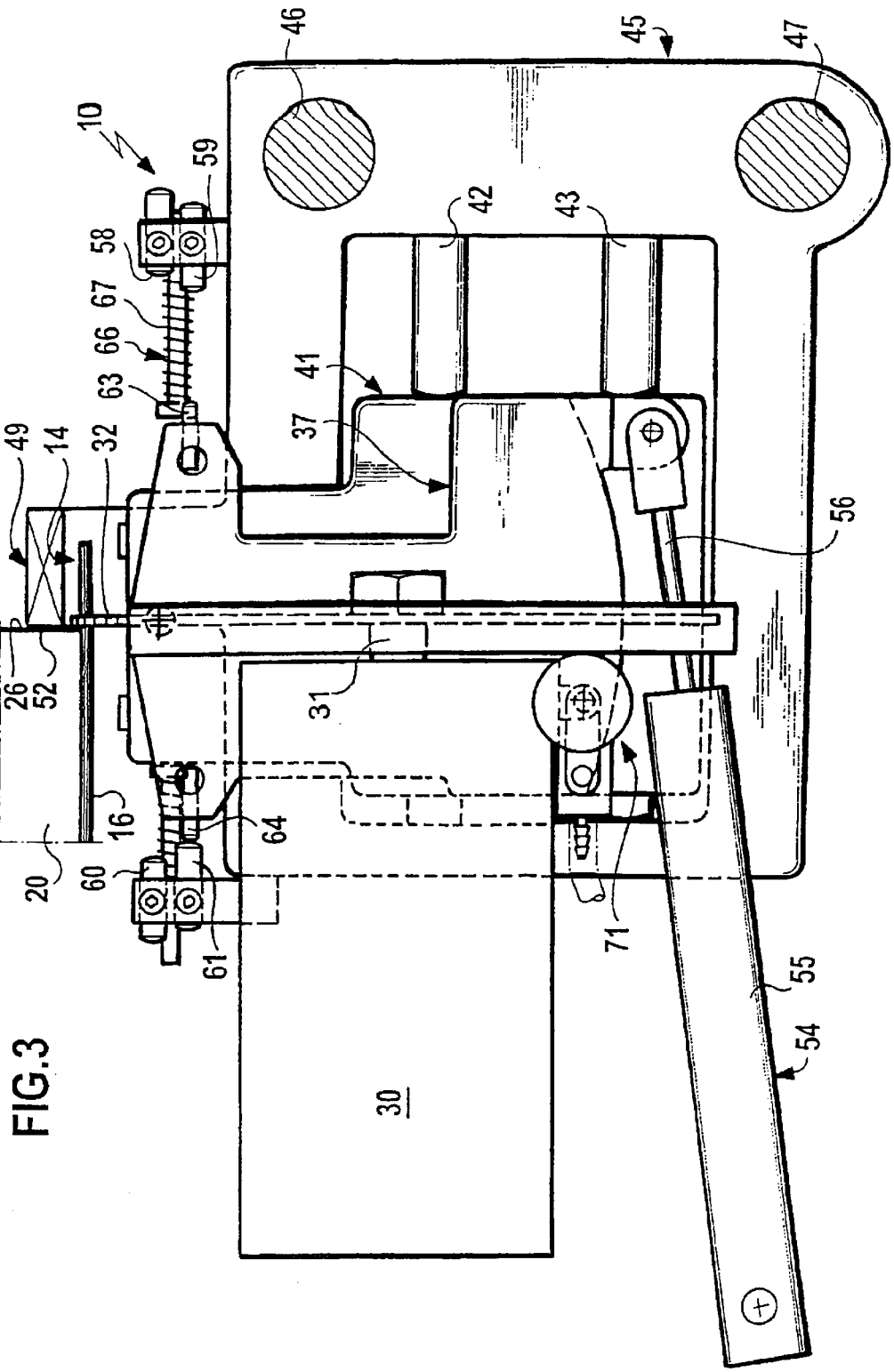
FIG. 3 shows a plan view of the cutting subassembly during the operation of cutting off a rear edge overhang with the saw blade oriented in alignment with a rear contact surface.
Figure 4:
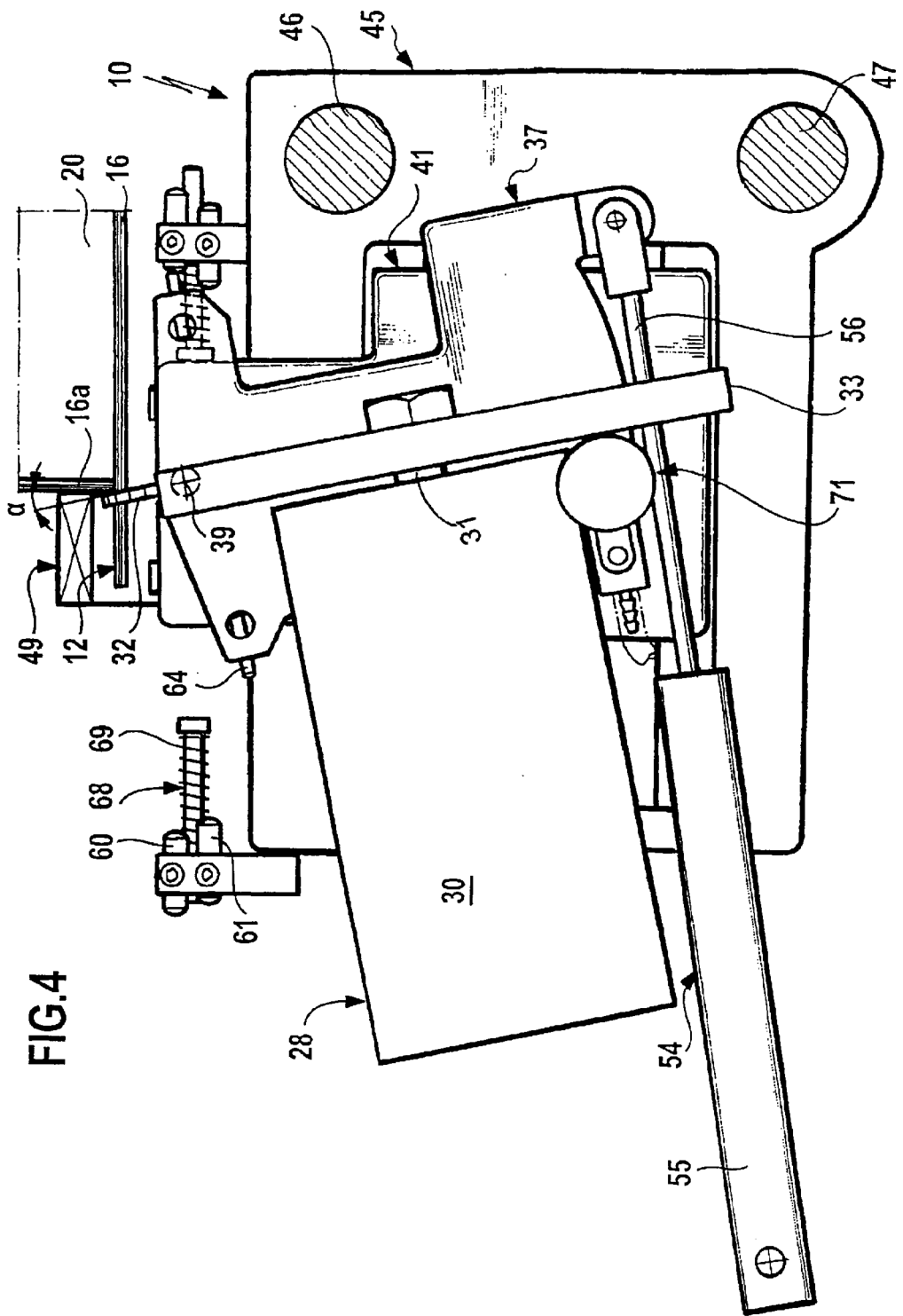
FIG. 4 shows a plan view of the cutting subassembly during the operation of cutting off a front edge overhang with the saw blade oriented obliquely in relation to the front contact surface.
Figure 5:
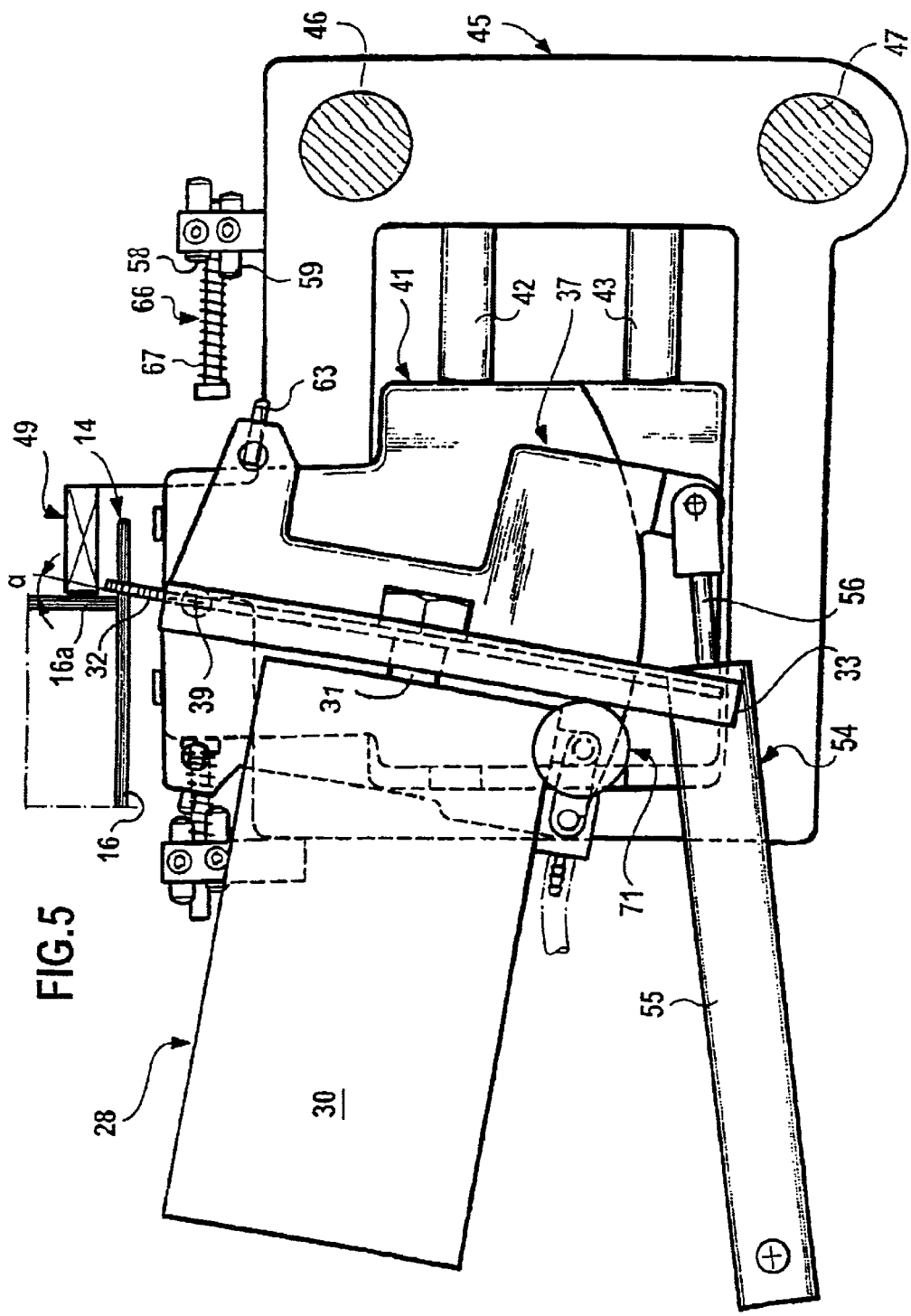
FIG. 5 shows a plan view of the cutting subassembly during the operation of cutting off a rear edge overhang with the saw blade oriented obliquely in relation to the rear contact surface.

Orientation of the saw blade 32 in alignment with the contact surfaces 51 and 52, however, is only desirable when the workpiece 20 is not as yet carrying any glue-on edge on the front and rear transverse sides 24 and 26, respectively, as illustrated in FIGS. 1 and 3. If, however, a glue-on edge 16a has already been glued on to the front and rear transverse sides 24 and 26, respectively, in a preceding operating step, as is illustrated in FIGS. 4 and 5, then orientation of the saw blade 32 in alignment with the contact surfaces 51 and 52 during the operation of cutting off the front and rear edge overhangs 12 and 14, respectively, may result in the glue-on edge 16a being damaged. In order to prevent such damage, the pivoting arm 37 may thus be pivoted about the pivot axis 39 as is illustrated in FIGS. 4 and 5. In particular, the saw blade 32 may be oriented obliquely in relation to the contact surfaces 51 and 52. For example, the saw blade 32 may assume an angle $\alpha$ of not more than approximately 15°, preferably approximately 10°, with the contact surfaces 51, 52.

The horizontal carriage 41 and the pivoting arm 37 are preferably driven pneumatically by means of a piston/cylinder subassembly 54. A cylinder 55 of the piston/cylinder subassembly 54 has its free end articulated on a supporting part (not illustrated in the drawing) of the machining equipment. A piston rod 56 of the piston/cylinder subassembly 54 has Its free end articulated on the pivoting arm 37. By virtue of pressure activation of the piston/cylinder subassembly, the pivoting arm 37 can be pivoted about its axis 39 and, in addition, the horizontal carriage 41 can be displaced along the guide rods 42 and 43.

In order to ensure that the pivoting arm 37 and the saw unit 28 secured on the pivoting arm 37 assume a defined position for cutting off the edge overhangs 12 and 14, the vertical carriage 45 has mounted on it a total of four stop bolts 58, 59, 60, 61. The stop bolts 58, 59, 60, and 61 can be adjusted in position in relation to the vertical carriage 45 parallel to the movement direction 22 and are oriented parallel to one another. The vertical carriage 45 carries the stop bolts 58 and 59, which are arranged opposite a corresponding stop pin 63 secured on one side of the pivoting arm 37. On the side located opposite the stop pin 63, a stop pin 64 is secured on the pivoting arm 37, and is directed towards stop bolts 60 and 61.

A spring bolt 66 with a helical spring 67 is retained on the vertical carriage 45 vertically beneath the stop bolts 58 and 59, and a corresponding spring bolt 68 with a helical spring 69 is disposed on the vertical carriage 45 beneath the stop bolts 60 and 61.

Figure 2:
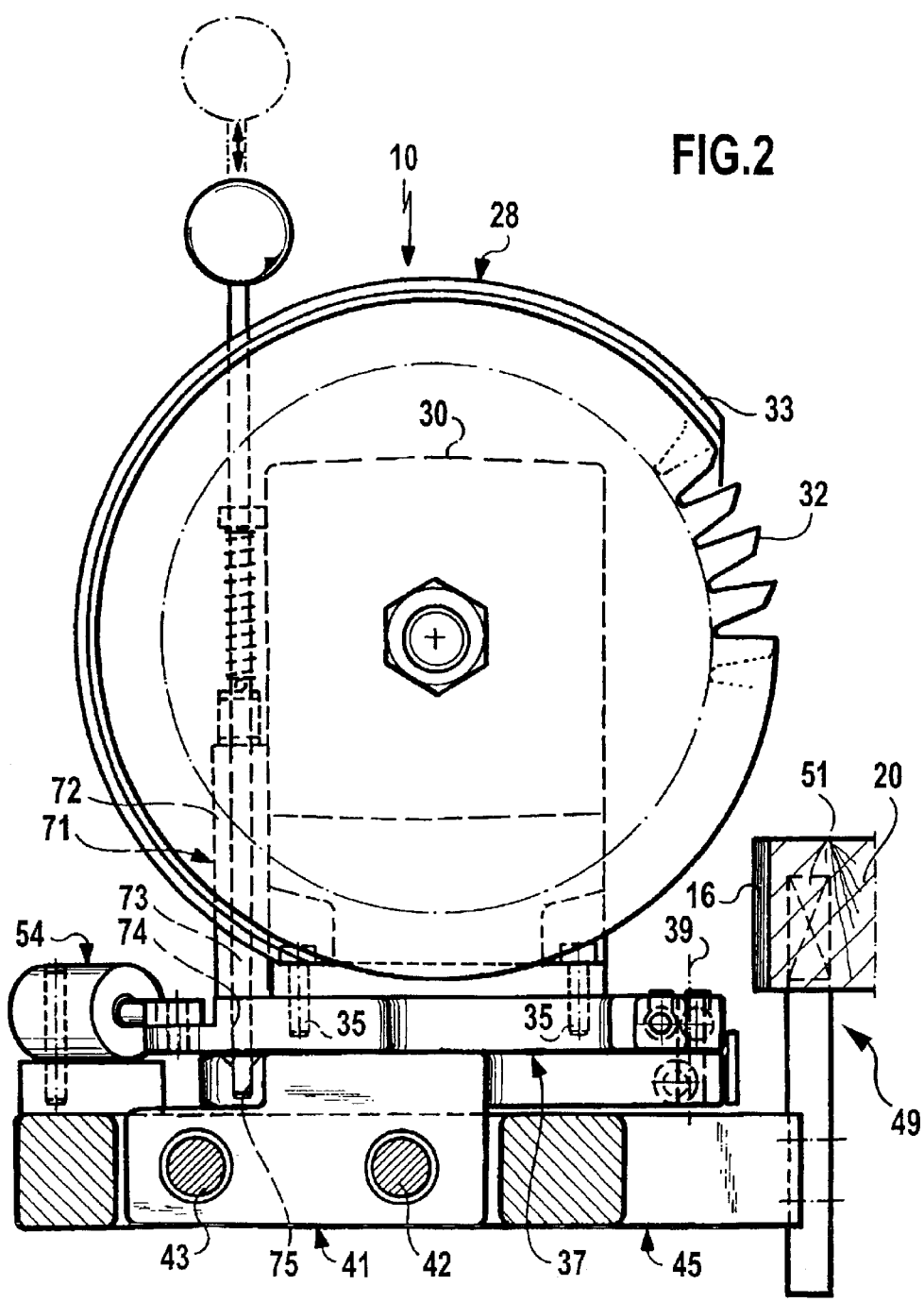
FIG. 2 shows a sectional view along the line 2—2 in FIG. 1.

Adjacent to the electric motor 30, the pivoting arm 37 carries a locking means 71 with a bar-like catch 73 which is guided in a sleeve 72. The bar-like catch 73 can engage through an aligned through-passage bore 74 of the pivoting arm 37 and penetrate into a blind hole 75 of the horizontal carriage 41. The catch 73 may be displaced between a raised position, which is illustrated by dotted lines In FIG. 2 and in which it is spaced apart from the blind hole 75, and a lowered position, which is illustrated by solid lines in FIG. 2 and in which it penetrates into the blind hole 75. If the catch 73 assumes its lowered position, this prevents a pivoting movement of the pivoting arm 37, so that the saw unit 28 can only be displaced parallel to the movement direction 22 of the workpiece 20 by means of the piston/cylinder subassembly 54, but not pivoted. When the catch 73 penetrates into the blind hole 75, then the saw blade 32 is oriented in alignment with the contact surfaces 51 and 52. The displacement movement of the horizontal carriage 41 along the guide rods 42 and 43 is then limited by the stop bolts 59 and 61, against which the associated stop pins 63 and 64, respectively, can be engaged during displacement of the horizontal carriage 41, so that the travel of the horizontal carriage 41 is limited by the stop bolts 59 and 61. When the locking means 71 is released, then the pivoting arm 37 can execute a pivoting movement about the pivot axis 39 in addition to the displacement movement parallel to the movement direction 22. The movement of the pivoting arm 37 is then limited by the stop bolts 58 and 60, against which the associated stop pins 63 and 64, respectively, can be engaged during a combined displacement/pivoting movement. A separate stop is consequently associated with the saw unit 28, and thus the saw blade 32, in each case both during the operation of cutting off the front edge overhang 12 and during the operation of cutting off the rear edge overhang 14. The saw blade 32 may be fixed in aligned orientation in relation to the respective contact surfaces 51 and 52 and also with oblique orientation in relation to the contact surfaces 51 and 52. It is therefore possible for the orientation of the saw blade 32 to be predetermined in a defined manner by the setting of said stop.

If the horizontal carriage 41 is moved in the direction of the stop bolts 58 and 59 by pressure actuation of the piston/cylinder subassembly 54, then, on approach to the stop bolts 58 and 59, it is subjected to an elastic decelerating force on account of the spring bolt 66 acting on it. This results in the displacement movement of the pivoting arm 37 being decelerated, while a pivoting movement of the pivoting arm 37 can still take place without obstruction, so that the stop pin 63 reliably reaches the respectively desired stop bolt 58 or 59. The same applies to the pivoting arm 37 approaching stop bolts 60 and 61, in the case of which its displacement movement is decelerated on account of the action of the spring bolt 68.

It is clear from the above that, by virtue of the locking means 71 being straightforwardly released or latched in, the cutting subassembly 10 can be used to execute saw cuts optionally either in alignment with the contact surfaces 51 and 52 or obliquely in relation to the contact surfaces 51, 52. The saw blade 32 can be adjusted in a straightforward manner here by means of the stop bolts 58 and 61.

The locking means 71 may be actuated manually or by means of an appropriate drive subassembly, for example by a piston/cylinder subassembly. This makes it possible for the actuation of the piston/cylinder subassembly 54 and the actuation of the locking means 71 to be controlled centrally by control subassemblies of the machine for machining the workpiece 20.

What is claimed is:

1. A cutting subassembly for machines by means of which a workpiece is machined in order for edge-material overhangs projecting beyond at least the front or rear transverse sides of the workpiece to be cut off, said transverse sides of the workpiece being oriented substantially transversely to a movement direction of the workpiece, which cutting subassembly is provided on longitudinal sides of the workpiece, said longitudinal sides running parallel to the movement direction, said cutting subassembly comprising:
   a saw unit which comprises a motor-driven saw blade being mounted for displacement between a position above the workpiece and a position beneath the workpiece;
   a contact element associated with the saw blade and having a first contact surface for engaging against a front transverse side of the workpiece as seen in the movement direction and a second contact surface for engaging against a rear transverse side of the workpiece as seen in the movement direction; and
   a piston/cylinder subassembly for pivoting of the saw blade;
   wherein:
   the saw blade is mounted such that it can be pivoted in relation to both the front and rear contact surfaces, between a first operating position for each contact surface, in which a cutting plane of the saw blade is oriented in alignment with a respective contact surface, and a second operating position for each contact surface, in which the cutting plane of the saw blade is obliquely in relation to the respective contact surface;
   the cutting subassembly comprising adjustable stops for orienting the saw blade in its first, aligned operating position and its second, obliquely oriented operating position; and
   the contact element and the saw blade are mounted such that they can be displaced in relation to one another.

2. The cutting subassembly as claimed in claim 1, wherein in the second operating position, the saw blade is positionable at an angle (α) of up to approximately 15° in relation to the contact surface.

3. The cutting subassembly as claimed in claim 1, wherein the saw blade can be pivoted and displaced by means of the piston/cylinder subassembly.

4. A cutting subassembly for machines by means of which a workpiece is machined in order for edge-material overhangs projecting beyond at least the front or rear transverse sides of the workpiece to be cut off, said transverse sides of the workpiece being oriented substantially transversely to a movement direction of the workpiece, which cutting subassembly is provided on longitudinal sides of the workpiece, said longitudinal sides running parallel to the movement direction, said cutting subassembly comprising:
   a saw unit which comprises a motor-driven saw blade being mounted for displacement between a position above the workpiece and a position beneath the workpiece;
   a contact element associated with the saw blade and having at least one contact surface for engaging against a front or rear transverse side of the workpiece;
   wherein:
   the saw blade is mounted such that it can be pivoted between a first operating position, in which a cutting plane of the saw blade is oriented in alignment with the contact surface, and a second operating position, in which the cutting plane of the saw blade is oriented obliquely in relation to the contact surface;
   the cutting subassembly comprising adjustable stops for orienting the saw blade in its first, aligned operating position and its second, obliquely oriented operating position;
   the cutting subassembly comprises a guide element which is displaceable parallel to the movement direction of the workpiece to provide for displacing the saw unit relative to the contact element; and
   the saw unit is mounted on the guide element such that it can be pivoted about a vertical pivot axis.

5. The cutting subassembly as claimed in claim 4, wherein:
   the guide element comprises a horizontal carriage on which the saw unit is mounted in a pivotable manner.

6. The cutting subassembly as claimed in claim 4, wherein:
   the saw unit is fixed in a releasable manner on the guide element with the saw blade oriented in a first operating position.

7. The cutting subassembly as claimed in claim 4, wherein:
   the saw unit is secured on a pivoting arm which is mounted in a pivotable manner on the guide element.

8. The cutting subassembly as claimed in claim 7, further comprising:
   a piston/cylinder subassembly for pivoting the pivoting arm.

9. The cutting subassembly as claimed in claim 8, wherein:
   the piston/cylinder subassembly is articulated on the pivoting arm.

10. A cutting subassembly for machines by means of which a workpiece is machined in order for edge-material overhangs projecting beyond at least the front or rear transverse sides of the workpiece to be cut off, said transverse sides of the workpiece being oriented substantially transversely to a movement direction of the workpiece, which cutting subassembly is provided on longitudinal sides of the workpiece, said longitudinal sides running parallel to the movement direction, said cutting subassembly comprising:

a saw unit which comprises a motor-driven saw blade being mounted for displacement between a position above the workpiece and a position beneath the workpiece;

a contact element associated with the saw blade and having at least one contact surface for engaging against a front or rear transverse side of the workpiece;

wherein:

the saw blade is mounted such that it can be pivoted between a first operating position, in which a cutting plane of the saw blade is oriented in alignment with the contact surface, and a second operating position, in which the cutting plane of the saw blade is oriented obliquely in relation to the contact surface;

the cutting subassembly comprising adjustable stops for orienting the saw blade in its first, aligned operating position and its second, obliquely oriented operating position; and the stops are each associated with at least one spring element in order to decelerate a displacement movement of the saw unit as the saw unit approaches each of said stops.

11. The cutting subassembly as claimed in claim 10, wherein:

the spring element is configured as a spring bolt for engaging against the horizontal carriage.

12. A cutting subassembly for machines by means of which a workpiece is machined in order for edge-material overhangs projecting beyond at least the front or rear transverse sides of the workpiece to be cut off, said transverse sides of the workpiece being oriented substantially transversely to a movement direction of the workpiece, which cutting subassembly is provided on longitudinal sides of the workpiece, said longitudinal sides running parallel to the movement direction, said cutting subassembly comprising:

a saw unit which comprises a motor-driven saw blade being mounted for displacement between a position above the workpiece and a position beneath the workpiece;

a contact element associated with the saw blade and having at least one contact surface for engaging against a front or rear transverse side of the workpiece;

wherein:

the saw blade is mounted such that it can be pivoted between a first operating position, in which a cutting plane of the saw blade is oriented in alignment with the contact surface, and a second operating position, in which the cutting plane of the saw blade is oriented obliquely in relation to the contact surface;

the cutting subassembly comprising adjustable stops for orienting the saw blade in its first, aligned operating position and its second, obliquely oriented operating position, and the stops are adjustable in the movement direction of the workpiece.

* * * * *

UNITED STATES PATENT AND TRADEMARK OFFICE
CERTIFICATE OF CORRECTION

PATENT NO. : 6,948,414 B2
DATED : September 27, 2005
INVENTOR(S) : Henzler et al.

It is certified that error appears in the above-identified patent and that said Letters Patent is hereby corrected as shown below:

Column 7,
Line 59, add -- oriented --, before "obliquely".

Signed and Sealed this

Tenth Day of January, 2006

JON W. DUDAS
*Director of the United States Patent and Trademark Office*